United States Patent
Lim

(10) Patent No.: US 6,544,809 B2
(45) Date of Patent: Apr. 8, 2003

(54) METHOD OF MANUFACTURING AN ARRAY SUBSTRATE FOR USE IN A REFLECTIVE LIQUID CRYSTAL DISPLAY DEVICE

(75) Inventor: Joo-Soo Lim, Kyoungsangbuk-do (KR)

(73) Assignee: LG. Philips LCD Co. Ltd., Seoul (KR)

( * ) Notice: Subject to any disclaimer, the term of this patent is extended or adjusted under 35 U.S.C. 154(b) by 113 days.

(21) Appl. No.: 09/739,821

(22) Filed: Dec. 20, 2000

(65) Prior Publication Data

US 2001/0023085 A1 Sep. 20, 2001

(30) Foreign Application Priority Data

Dec. 28, 1999 (KR) ......................... 1999-63249

(51) Int. Cl.[7] .............................. H01L 21/00; H01J 1/62
(52) U.S. Cl. ........................................ 438/29; 313/504
(58) Field of Search ..................... 438/22, 47, 57, 438/944, 900; 313/504, 506

(56) References Cited

U.S. PATENT DOCUMENTS

| | | | |
|---|---|---|---|
| 5,701,055 A | * 12/1997 | Nagayama et al. | 313/504 |
| 6,255,775 B1 | * 7/2001 | Ikuko et al. | 313/506 |
| 6,259,500 B1 | * 7/2001 | Kijima et al. | 349/113 |
| 6,302,756 B1 | * 10/2001 | Ootsuki et al. | 445/24 |
| 6,306,559 B1 | * 10/2001 | Tanamura et al. | 430/315 |

* cited by examiner

*Primary Examiner*—Matthew Smith
*Assistant Examiner*—Calvin Lee
(74) *Attorney, Agent, or Firm*—Birch, Stewart, Kolasch & Birch, LLP

(57) ABSTRACT

The present invention discloses a method of manufacturing an array substrate for use in a reflective liquid crystal display device, including: providing a thin film transistor array substrate; depositing a metal layer on the substrate using a shadow mask having a plurality of holes; and patterning the metal layer into a reflective electrode for connecting to the thin film transistor.

14 Claims, 3 Drawing Sheets

METHOD OF MANUFACTURING AN ARRAY SUBSTRATE FOR USE IN A REFLECTIVE LIQUID CRYSTAL DISPLAY DEVICE

CROSS REFERENCE

This application claims the benefit of Korean Patent Application No. 1999-63249, filed on Dec. 28, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly to a method of manufacturing an array substrate for use in a reflective LCD device.

2. Description of Related Art

Liquid crystal display (LCD) devices are in wide use as display devices capable of being reduced in weight, size and thickness. In general, the LCD device includes upper and lower substrates with a liquid crystal layer interposed therebetween. The upper substrate includes a common electrode and a color filter, and the lower substrate includes a pixel electrode and TFTs. An upper polarizer is arranged on a front surface of the upper substrate, and a lower polarizer is arranged on a bottom surface of the lower substrate. A back light device is arranged under the lower substrate as a light source.

The LCD device is divided into a transmissive LCD device and a reflective LCD device. The typical transmissive LCD device displays images using light from the back light device. However, the transmissive LCD device is a non-effective light converter that merely transmits about 3% to about 8% of light from the back light device. In other words, as shown in FIG. 1, an observer gets to see about 7% of light from the back light device. Therefore, the transmissive LCD device requires a back light device having a high brightness, leading to a high power consumption.

In order to achieve the back light device having a high brightness, a sufficient power must be supplied to the back light device, thereby increasing a battery weight. However, even such a back light device can not be used for a long time.

To overcome the problems described above, the reflective LCD device has been introduced. Since the reflective LCD device is driven using ambient light, the power consumption becomes lower, whereby it is possible to use it for a long time and it is easy to carry due to its light weight.

FIG. 2 is a plan view illustrating a lower array substrate of a conventional reflective LCD device. As shown in FIG. 2, data lines 2 and 4 are arranged in a longitudinal direction, and gate lines 6 and 8 are arranged in a transverse direction perpendicular to the data lines 2 and 4. A reflective electrode 10 is arranged on a region defined by the gate and data lines. TFTs are arranged at a cross point of the gate and data lines. Each of the TFTs includes a gate electrode 18, a source electrode 12 and a drain electrode 14. The gate electrode 18 extends from the gate line 8, and the source electrode 12 extends from the data line 2. The drain electrode 14 is spaced apart from the source electrode 12 and contacts the reflective electrode 10 through a contact hole 16.

FIG. 3 is a cross sectional view taken along line III—III of FIG. 2. As shown in FIG. 2, the gate electrode 18 is formed on a substrate 1, and a gate insulating layer 20 is formed on the gate electrode 18 and an exposed surface of the substrate 1. A semiconductor layer 22 is formed on the gate insulating layer 20. The source and drain electrode 12 and 14 overlaps both end portions of the semiconductor layer 22. A passivation film 24 is formed over the whole surface of the substrate 1 while covering the source and drain electrodes 12 and 14. The passivation film 24 has the contact hole 16 on a portion of the drain electrode 14. The reflective electrode 10 is formed on the passivation film and contacts the drain electrode 14 through the contact hole 16. The reflective electrode is made of a material having a good reflectance.

As described above, since the reflective LCD device uses ambient light other than an internal light source such as a back light device, it can be used for a long time. In other words, the reflective LCD device is driven using light reflected from the reflective electrode 10.

However, as shown in FIG. 3, the reflective electrode 10 has a flat structure, and thus a mirror effect may occur when an observer views images displayed by the reflective electrode 10. In other words, a face of an observer may be reflected by the flat reflective electrode 10 due to the flatness of the flat reflective electrode 10. Further, since no back light but ambient light is used, the brightness is relatively low.

In order to overcome the problems described above, as shown in FIG. 4, a reflective electrode having concave or convex portions 30 has been introduced. The reflective electrode 10 having the concave or convex portions 30, as shown in FIG. 5, causes diffuse reflection, thereby reducing the mirror effect. In addition, since the reflection area of the reflective electrode 10 increases due to the thickness of the reflective electrode 10, the brightness increases. Typically, in order to form the concave or convex portions 30 of the reflective electrode 10, the passivation film 24 and the insulating layer 20 at a pixel portion are etched through using at least two mask processes. Therefore, the manufacturing process increases in number, and the manufacturing yield is lowered.

For the foregoing reasons, there is a need for a reflective liquid crystal display device having a high brightness and a high manufacturing yield that is manufactured by a simple process.

SUMMARY OF THE INVENTION

To overcome the problems described above, preferred embodiments of the present invention provide a reflective liquid crystal display device having a high brightness and a high manufacturing yield that is manufactured by a simple process.

In order to achieve the above object, the preferred embodiments of the present invention provide a method of manufacturing an array substrate for use in a reflective liquid crystal display device, including: providing a thin film transistor array substrate; depositing a metal layer on the substrate using a shadow mask having a plurality of holes; and patterning the metal layer into a reflective electrode for connecting to the thin film transistor.

The present invention further provides a method of manufacturing an array substrate for use in a reflective liquid crystal display device, including: providing deposition equipment having a sputtering target, a thin film transistor array substrate, and a mask, the mask having a plurality of holes and located between the sputtering target and the substrate; depositing a metal layer on the substrate by allowing metal particles generated from the target to pass through the holes; and patterning the metal layer into a reflective electrode.

The holes of the mask have one of a trapezoid, a circular and a rectangular cross section.

A mask is used to form a reflective electrode of a reflective LCD device according to the preferred embodiment of the present invention, since an additional process to form the concave or convex portion is not required, and the manufacturing process is simplified, thereby increasing a manufacturing yield. In addition, since the reflective electrode has concave or convex portions, the brightness can increase.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to a preferred embodiment of the present invention, examples of which are illustrated in the accompanying drawings.

Figure 1:
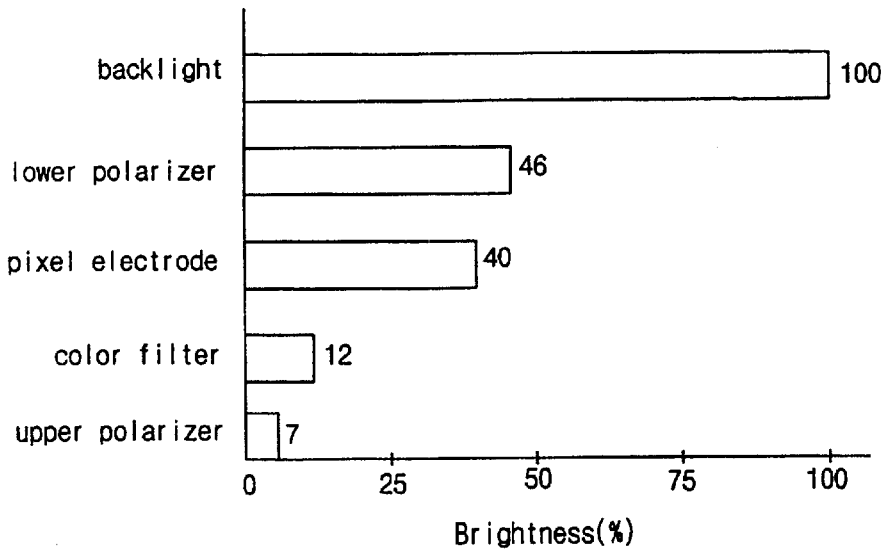
FIG. 1 is a graph illustrating transmittance after light passes through each layer of a conventional liquid crystal display device.
Figure 2:
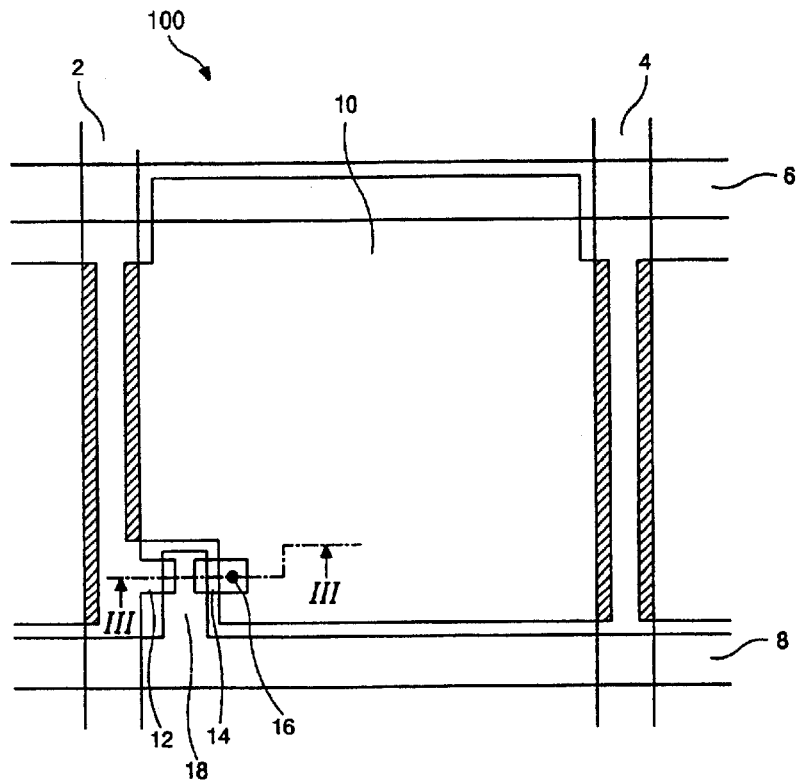
FIG. 2 is a plan view illustrating a lower array substrate of a conventional reflective LCD device.
Figure 3:
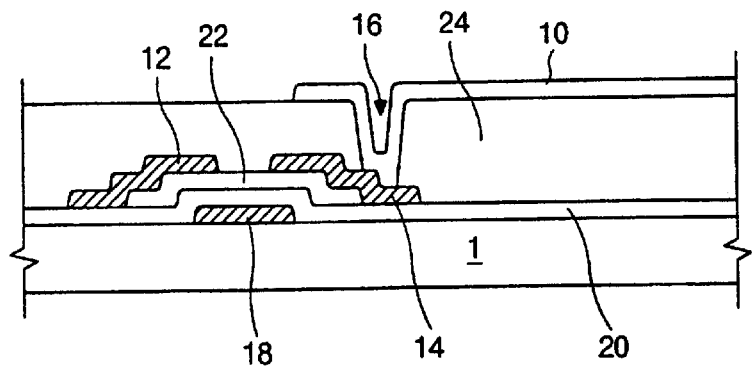
FIG. 3 is a cross sectional view taken along line III—III of FIG. 2.
Figure 4:
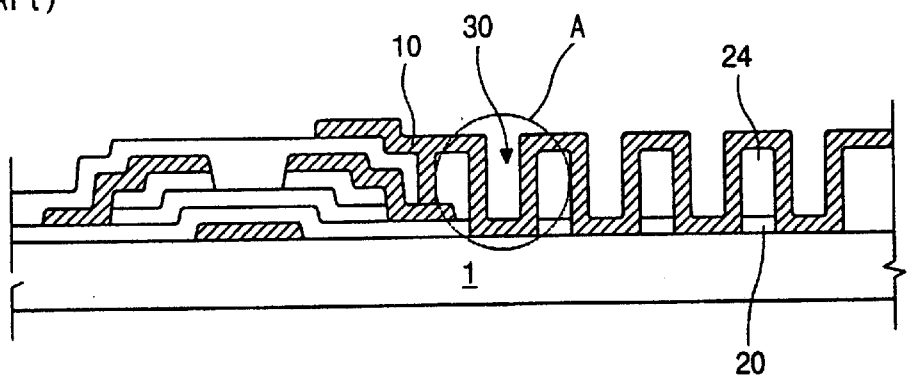
FIG. 4 is a cross sectional view illustrating a modified reflective electrode of the conventional reflective LCD device.
Figure 5:
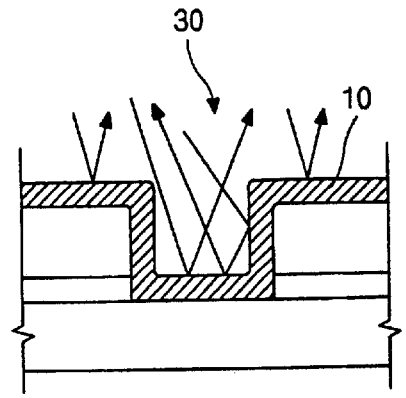
FIG. 5 is an enlarged view illustrating a portion A of FIG. 4.
Figure 6:
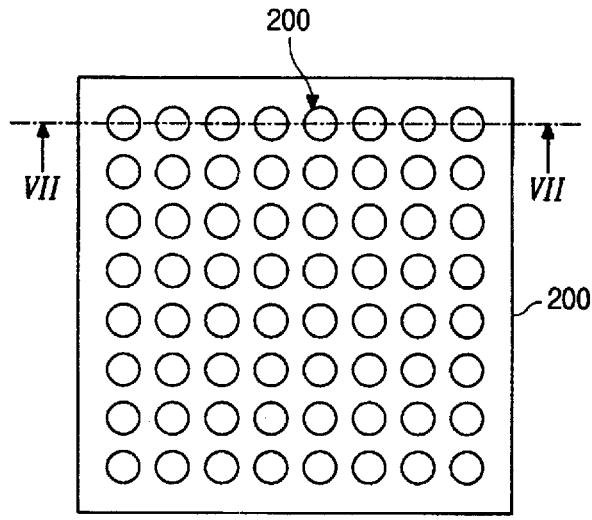
FIG. 6 is a plan view illustrating a mask used to form a reflective electrode of a reflective liquid crystal display (LCD) device according to a preferred embodiment of the present invention.

FIG. 6 is a plan view illustrating a mask used to form a reflective electrode of a reflective liquid crystal display (LCD) device according to the preferred embodiment of the present invention. As shown in FIG. 6, the mask 200 includes a plurality of holes 210. The holes 210 are placed at an intermediate location between a test piece (i.e., a thin film transistor array substrate) and a sputtering target in an equipment used to deposit a metal thin film, for example, a sputtering apparatus. Metal particles spattered from the sputtering target passes through the holes 210 to be deposited on the test piece. The mask 200 is referred to as a shadow mask. Preferably, the holes 210 have a trapezoid cross section (see FIG. 7). The holes 210 may have a circular and a rectangular cross section, and therefore a shape of the holes 210 is limited to the present invention.

In order to form the reflective electrode having concave or convex portions, in the preferred embodiment of the present invention, the insulating layer and the passivation film are not etched. When a metal layer for the reflective electrode is formed, the concave or convex portions are formed at the same time. In other words, using the shadow mask 200, the reflective electrode having the concave or convex portions can be formed.

Figure 7:
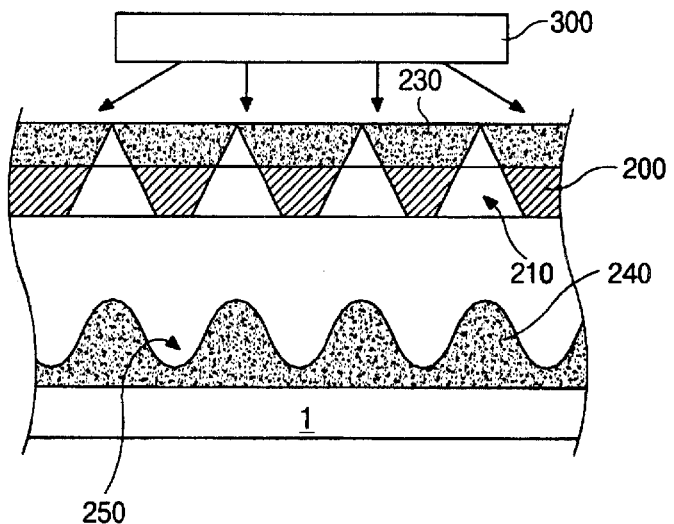
FIG. 7 is a cross-sectional view taken along line VII—VII of FIG. 6.

FIG. 7 is a cross-sectional view taken along line VII—VII of FIG. 6. A method of forming the reflective electrode of the reflective LCD device is explained below in detail with reference to FIG. 7. As shown in FIG. 7, first a substrate 1 on which the reflective electrode is form is placed in a deposition equipment for a metal thin film such as a sputtering apparatus and an evaporator. A thin film target 300 is placed over the substrate 1, and the mask 200 is placed between the substrate 1 and the target 300. Then, using the shadow mask 200 having a plurality of the holes 210, a metal thin film is deposited on the substrate 1. At this time, the metal particles generated from the target 300 pass through the holes 210. As a time of depositing a metal thin film becomes lengthy, the holes 210 are clogged by the metal particles 230, and the amount of the metal particles that pass through the holes 210 is gradually decreased. As a result, a metal layer that is deposited on the substrate 1, i.e., the reflective electrode 240 gets to have the concave or convex portions 250.

Using the method of depositing a metal thin film described above, the reflective electrode having the concave or convex portions can be formed without any additional processes.

Figure 8:
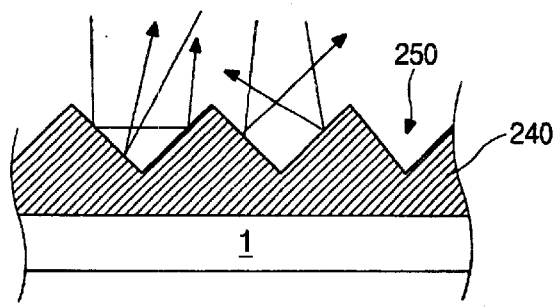
FIG. 8 is a cross-sectional view illustrating the reflective electrode formed by the deposition method according to the preferred embodiment of the present invention

FIG. 8 is a cross-sectional view illustrating the reflective electrode formed by the deposition method according to the preferred embodiment of the present invention. As shown in FIG. 8, the concave or convex portions 250 have a triangular cross section. Therefore, the reflection index is improved, leading to high brightness.

As described herein before, by using a mask to form a reflective electrode of a reflective LCD device according to the preferred embodiment of the present invention, since an additional process to form the concave or convex portion is not required, the manufacturing process is simplified, thereby increasing manufacturing yield. In addition, since the reflective electrode has concave or convex portions, the brightness can increase.

While the invention has been particularly shown and described with reference to first preferred embodiments thereof, it will be understood by those skilled in the art that the foregoing and other changes in form and details may be made therein without departing from the spirit and scope of the invention.

What is claimed is:

1. A method of manufacturing an array substrate for use in a reflective liquid crystal display device, comprising:

providing a thin film transistor array substrate;

depositing a metal layer on the substrate using a shadow mask having a plurality of holes, the metal layer having concave or convex portions; and patterning the metal layer into a reflective electrode for connecting to the thin film transistor.

2. The method of claim 1, wherein the holes of the shadow mask have one of a trapezoid, a circular and a rectangular cross section.

3. The method of claim 1 wherein the holes have circular openings.

4. The method of claim 1 wherein the concave or convex portions increase brightness.

5. The method of claim 1, wherein the step of depositing the metal layer is performed by sputtering.

6. The method of claim 1, wherein the concave or convex portions have a sinusoidal cross section.

7. The method of claim 1, wherein the concave or convex portions have a triangular cross section.

8. A method of manufacturing an array substrate for use in a reflective liquid crystal display device, comprising:

provide a deposition equipment having a sputtering target, a thin film transistor array substrate, and a mask, the mask having a plurality of holes and located between the sputtering target and the substrate;

depositing a metal layer on the substrate by allowing metal particles generated from the target to pass through the holes, the metal layer having concave or convex portions; and patterning the metal layer into a reflective electrode.

9. The method of claim 8, wherein the holes of the mask have one of a trapezoid, a circular and a rectangular cross section.

10. The method of claim 8, wherein the holes have circular openings.

11. The method of claim 8, wherein the concave or convex portions increase brightness.

12. The method of claim 8 wherein the step of depositing the metal layer is performed by sputtering.

13. The method of claim 8 wherein the concave or convex portions have a sinusoidal cross section.

14. The method of claim 8 wherein the concave or convex portions have a triangular cross section.

\* \* \* \* \*